US005461991A

United States Patent [19]

Wagner

[11] Patent Number: 5,461,991

[45] Date of Patent: Oct. 31, 1995

[54] EQUIPMENT AND PROCESS FOR MOLTEN ALLOY PYROLYSIS OF HAZARDOUS LIQUID WASTE

[76] Inventor: Anthony S. Wagner, 13709 Hwy. 71 W., Bee Caves, Tex. 78738-3113

[21] Appl. No.: 225,612

[22] Filed: Apr. 11, 1994

Related U.S. Application Data

[63] Continuation-in-part of Ser. No. 103,122, Aug. 9, 1993, Pat. No. 5,359,947, which is a continuation-in-part of Ser. No. 982,450, Nov. 27, 1992, Pat. No. 5,271,341, which is a continuation-in-part of Ser. No. 699,756, May 14, 1991, Pat. No. 5,167,919, which is a continuation-in-part of Ser. No. 524,278, May 16, 1990, Pat. No. 5,000,101.

[51] Int. Cl.$^{6}$ .................................. F23G 7/04; C02F 1/72

[52] U.S. Cl. .................................. 110/346; 588/201

[58] Field of Search .................................. 110/346, 235, 110/238, 250; 588/201

[56] References Cited

U.S. PATENT DOCUMENTS

| | | | |
|---|---|---|---|
| 4,666,696 | 5/1987 | Shultz | 588/201 X |
| 5,000,101 | 3/1991 | Wagner | 110/346 |
| 5,134,944 | 8/1992 | Keller et al. | 110/234 |
| 5,191,154 | 3/1993 | Nagel | 588/201 |
| 5,359,947 | 11/1994 | Wagner | 110/346 |

*Primary Examiner*—Henry A. Bennet
*Assistant Examiner*—William C. Doerrler
*Attorney, Agent, or Firm*—Joseph F. Long

[57] ABSTRACT

Process and Equipment for degradation of hazardous liquid waste into innocuous elements or salts by diffusing a feed stream below the surface of a circulating molten alloy bath is disclosed.

3 Claims, 3 Drawing Sheets

EQUIPMENT AND PROCESS FOR MOLTEN ALLOY PYROLYSIS OF HAZARDOUS LIQUID WASTE

BACKGROUND OF THE INVENTION

This a continuation-in-part of Ser. No. 08/103,122, filed Aug. 9, 1993, entitled "Equipment and Process for Waste Pyrolysis and Off Gas Oxidative Treatment" now U.S. Pat. No. 5,359,947, which is a continuation-in-part of Ser. No. 07/982,450 filed Nov. 27, 1992, and entitled "Equipment and Process for Medical Waste Disintegration and Reclamation" now U.S. Pat. No. 5,271,341, which is in turn a continuation-in-part of Ser. No. 07/699,756, U.S. Pat. No. 5,167,919, filed May 14, 1991, entitled "Waste Treatment and Metal Reactant alloy Composition" which is, in turn, a continuation-in-part of Ser. No. 07/524,278, U.S. Pat. No. 5,000,101 filed May 16, 1990, entitled: "a Hazardous Waste Reclamation Process".

The closest prior art is Ser. Nos. 08/103,122; 07/982,450; 07/699,756 and 07/524,278, all by Anthony S. Wagner, filed and entitled as outlined above.

The present invention differs significantly in having a unique under-the-surface diffuser designed to make maximum use of a circulating molten alloy. The circulating alloy is naturally produced using electromagnetic side wall heating to melt and maintain the alloy in a molten state. A pump type stirrer could be used in the molten bath to achieve a similar effect when fossil fuel heating of the molten alloy is used.

The invention comprises one or more ceramic diffusers designed to float or be mechanically submerged in the molten alloy with a liquid feed line going through the diffuser and exiting into a channeled bottom face. The channels on the face are designed to provide a circuitous path to achieve maximum contact with the circulating molten alloy to achieve total degradation of the hazardous liquid to carbon, hydrogen, nitrogen, and various metal ions, where present. The metallic ions will react to remain in the molten alloy anions such as bromine, chlorine, etc. will form salts with components of the alloy composition. The alloy composed of aluminum, iron, copper, calcium, and zinc with amounts of each component as follows:

25–95 weight percent aluminum

0–50 weight percent iron

0–50 weight percent calcium

0–50 weight percent zinc

0–50 weight percent copper

SUMMARY OF THE INVENTION

The invention comprises process and equipment for pyrolyzing a waste stream by pumping the hazardous liquid waste through a floating or submerged ceramic diffuser into an agitated molten alloy composition. The alloy composition may be varied to suit a particular liquid waste stream. The alloy composition, normally aluminum, copper, calcium, iron and zinc, is held in a molten state. Induction heating with consequent induced circulation is a preferred embodiment of a heater for the alloy pyrolysis reactor. Pyrolysis is carried out in the absence of atmospheric oxygen. Inert gas or carbon dioxide may be used for purging the system of atmospheric oxygen. Ceramic diffusers with a liquid feed line going each diffuser may float or be held with diffuser faces submerged in the molten alloy. In a preferred embodiment the face of each diffuser is channeled. Channeled diffuser faces and circulating molten alloy assure maximum contact of the feed and initial degradation products with the molten alloy.

Off gas containing mainly hydrogen, water vapor, carbon, nitrogen and/or carbon dioxide may be subject to additional heat to achieve a temperature of over 250° C. by using an additional induction heater in the off gas line.

In a preferred embodiment off gas is scrubbed using an aqueous liquid feed through spray nozzles just ahead of a cyclone separator to remove carbon. Sludge from the cyclone separator is filtered through one of a pair of dual filters to remove carbon and allow in-line filter cleaning. Aqueous discharge from the filters may go through a cooler prior to recycling to spray nozzles for continuous scrubbing. Water make up or purge necessary will depend upon operating conditions. With temperatures of circulating liquid sufficiently high very little purge other than vapor to the atmosphere will be required. Normal controls and relief valves are used in the process.

DETAILED DESCRIPTION OF THE DRAWINGS

The invention may best be described from the drawings.

Figure 1:
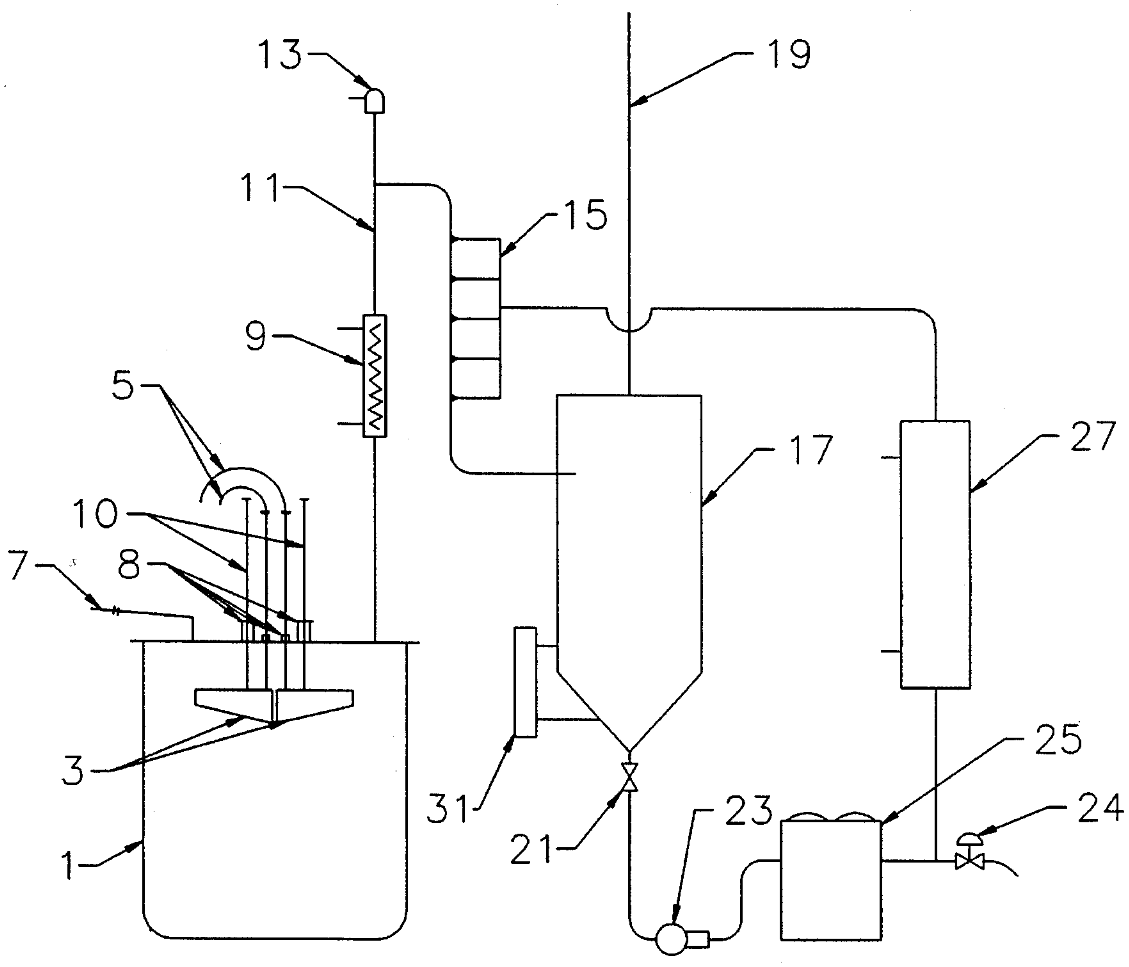
FIG. 1 shows the process.

The process is shown in FIG. 1. Reactor 1 holds a molten alloy comprised of aluminum, copper, zinc, iron, and calcium, but normally predominantly aluminum compositions may be varied to be most economical to treat a particular waste stream. For example for decomposition of PCB, polychlorobiphenyls, the composition would have a large amount of calcium to form calcium chloride rather than volatile aluminum chloride. Alloy compositions normally would be within the following ranges:

25–95 weight percent aluminum

0–50 weight percent iron

0–50 weight percent calcium

0–50 weight percent copper

0–50 weight percent zinc.

Reactor 1 may be heated electrically or by fossil fuel and is preferably held above 850° C. If heated by electromagnetic induction the molten allow will circulate by induction forces. This is a preferred embodiment. If otherwise heated, circulation which is desirable may be achieved with a pump type agitator. A feed stream 5 is fed through one or more submerged diffusers 3, described in more detail in FIG. 2, 3, and 4. In a preferred embodiment diffuser 3 has a channeled bottom face but in some cases a smooth face may work equally well. Oxygen is purged out of the unit with an inert gas through line 7. Carbon dioxide may also be used and is preferred. Off-gas goes through line 11 and is reexposed to over 250° C. temperature using induction heater 9. Relief valve 13 is sized to handle steam generated when waste liquid fed is essentially water. Composition of material in off gas line 11 will be essentially hydrogen, carbon, purge gas, and steam. Water from, spray nozzles 15 in the off-gas line ahead of cyclone separator 17 serve to scrub and cool the gas. Hydrogen, purge gas and water vapor escape to the atmosphere through line 19. Sludge and scrubbing water drain through valve 21 to sludge pump 23. Sludge pump 23 pumps material through a solids filter 25. Dual large capacity filters allowing one filter to be manually cleaned without shutting down the system are preferred. Filter effluent liquid may be partially recycled through cooler 27 to spray nozzles 15. Purge valve 29 may be controlled to hold a low level in separator 17 by level controller 3.

Figure 2:
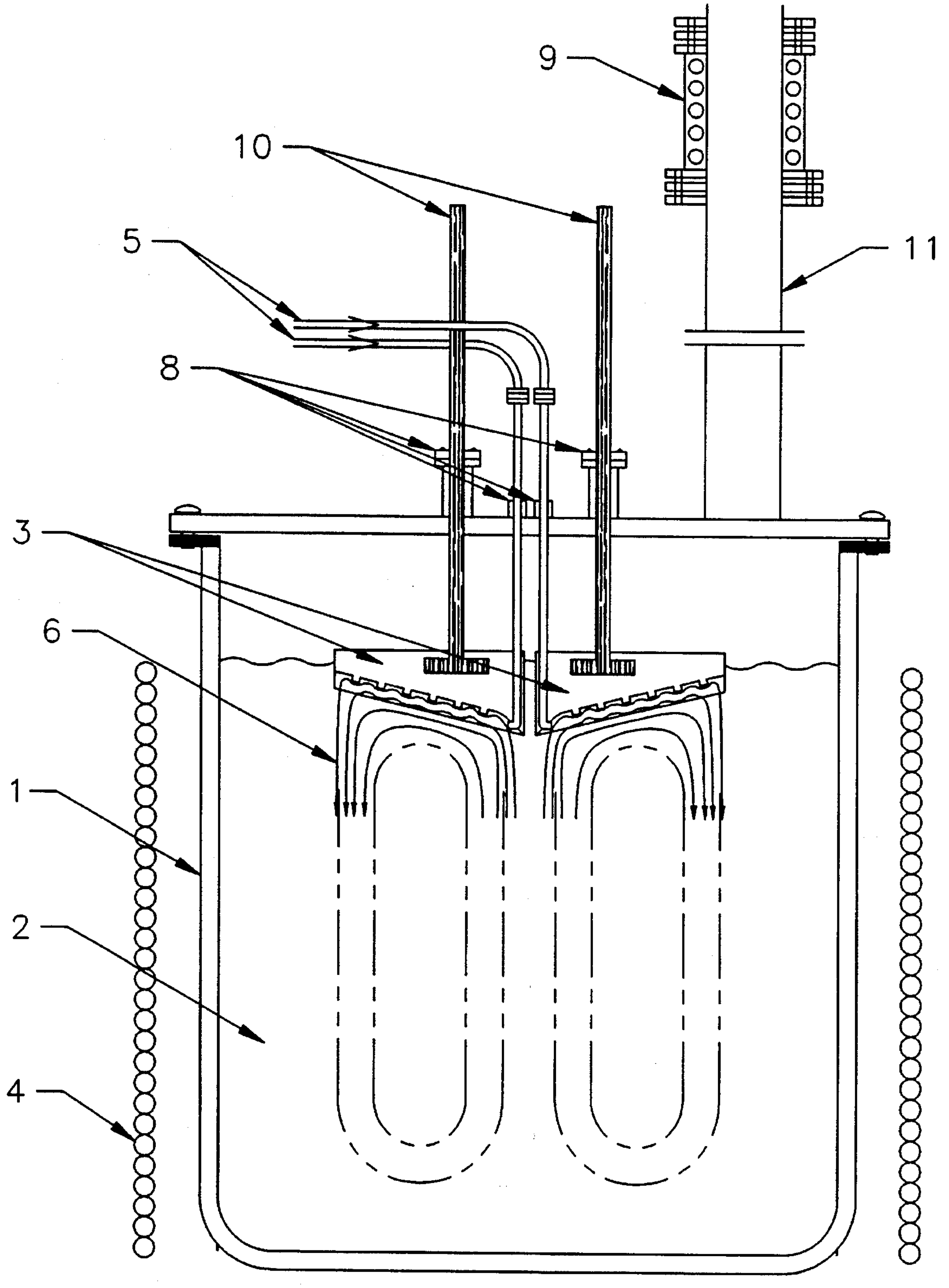
FIG. 2 shows details of a preferred embodiment of a reactor.
Figure 3:
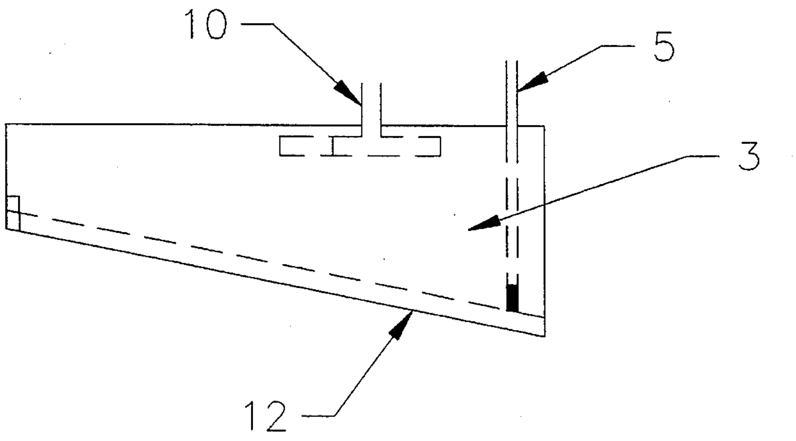
FIG. 3 shows a sideview of a preferred type submersed ceramic diffuser.

In FIG. 2 we show details of a preferred reactor 1. Reactor 1 is preferably formed from cast ceramic. As shown induction heater 4 heats molten alloy 2 and this induction heating and forces associated therewith cause circulation of molten alloy 2 as indicated by lines 6. This circulation tends to keep fresh alloy 2 moving continuously across the inclined face of ceramic diffusers 3. Support rods 10 going through packing glands 8 allow diffusers 3 to float or be adjustably held in alloy 2 by tightening or loosening packing glands 8. Feed lines 5 are cast into diffuser 3 in a lower end and connected to feed pumps (not shown) with flexible tubing. The shape of lower face of diffuser 3 increases molten alloy contact time to allow for complete reaction.

In FIG. 2 we've shown a side view of diffuser 3. The ceramic casting is cast around an extension of a support rod 10 and the feed tube 5 (shown in dotted lines) Channel 12 extends below bottom face 18 by minimum of one inch. Opening 14 in channel 12 aids in channeling the products of reaction for contact. This is shown more clearly in FIG. 4.

Figure 4:
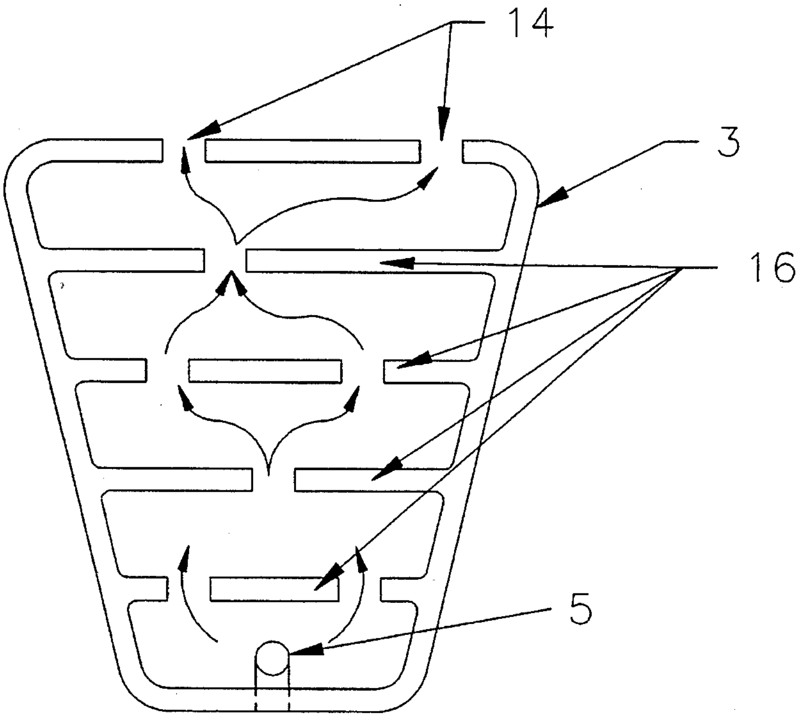
FIG. 4 shows a bottom face of the ceramic diffuser.

In FIG. 4 we've shown a bottom view of diffuser 3. Feed tube 5 exits into alloy 2. FIG. 2, through the deepest end of diffuser 3, when diffuser 3 is submerged. With liquid feed, reaction products will flow as indicated by arrows 16 and exit through opening 14. Channel 12 around the periphery of the bottom face of the diffuser is at minimum one half inch higher or deeper than diffuser channels 16. The lip 12 and diffuser channels 16 and circulating action of alloy 2 interact to give complete contact of feed liquid and reaction products. Hazardous liquids such as PCB's, polychlorobiphenyls, phosphochlorides, chlorosulfide, etc. will be completely dissociated to elements with anions such as chlorine, bromine, etc. being held in the molten alloy 2 and hydrogen, carbon, nitrogen and carbon dioxide being carried away on the off gas.

What is claimed:

1. A Circulating Molten Alloy Waste Pyrolysis Process and Equipment comprising:

a) a molten alloy bath;

b) adjustable submerged ceramic diffuser units in said bath;

c) a feed pump and flexible feed lines,said feed lines being connected to rigid feed lines leading into said ceramic diffuser units and to a discharge of said feed pumps;

d) an off gas line from said alloy bath;

e) an induction heater means in said off gas line to heat off gas in said off gas line to above 250 degrees centigrade;

f) spray nozzles in said off gas line downstream of said induction heater means;

g) a scrubber connected to an exit end of said off gas line;

h) a drain line from said scrubber;

i) a sludge pump taking suction from said drain line;

j) a carbon removal filter means in a discharge line from said sludge pump, acting to remove carbon particles, with discharge liquid recycling to said spray nozzles;

k) an inert gas purge means to purge oxygen from said unit.

2. A Circulating Molten Alloy Waste Pyrolysis Process and Equipment as in claim 1 wherein said diffuser unit has a channeled face to enhance contact of feed liquid and reaction products in said molten alloy bath.

3. A Circulating Molten Alloy Waste Pyrolysis Process and Equipment as in claim 1 wherein said molten alloy comprises:

25–95 weight percent aluminum

0–50 weight percent zinc

0–50 weight percent copper

0–50 weight percent iron

0–50 weight percent calcium.

* * * * *